Figure 1:
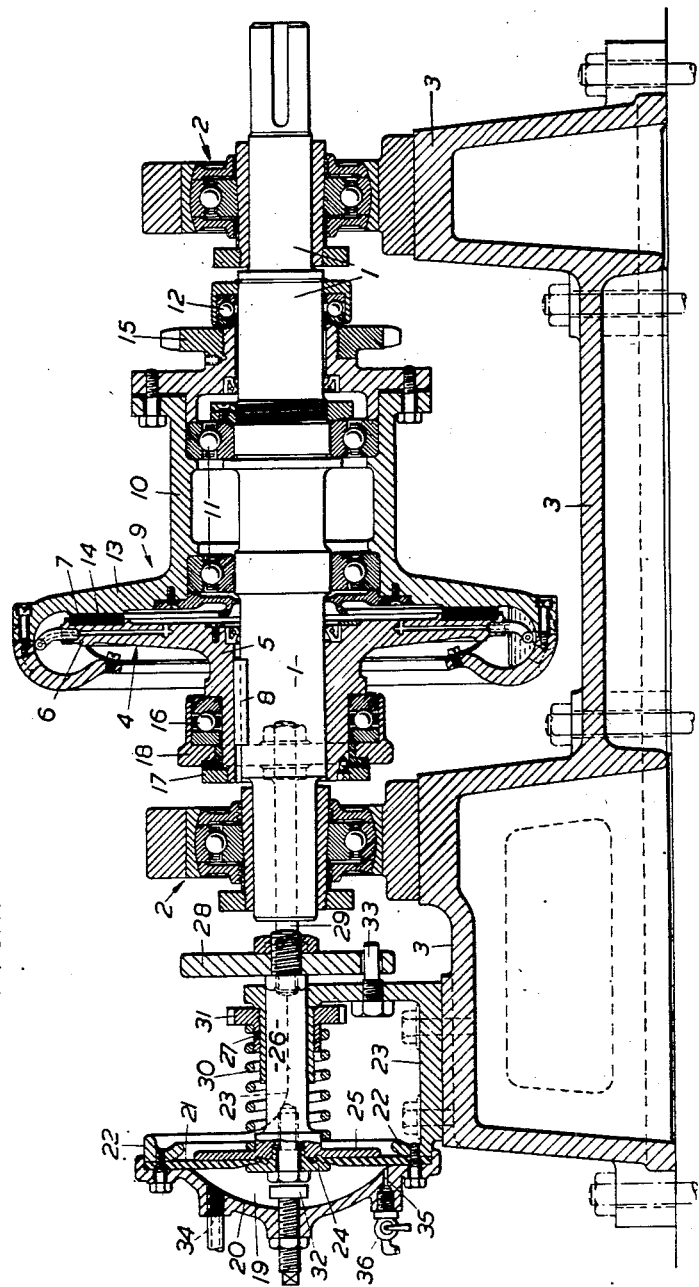

April 16, 1957.  A. B. F. G. RICHARDSON  2,788,875
FRICTION CLUTCHES
Filed March 26, 1952  2 Sheets-Sheet 1

Inventor
Arthur Bruce Fraser Gillespie Richardson

By
Attorneys

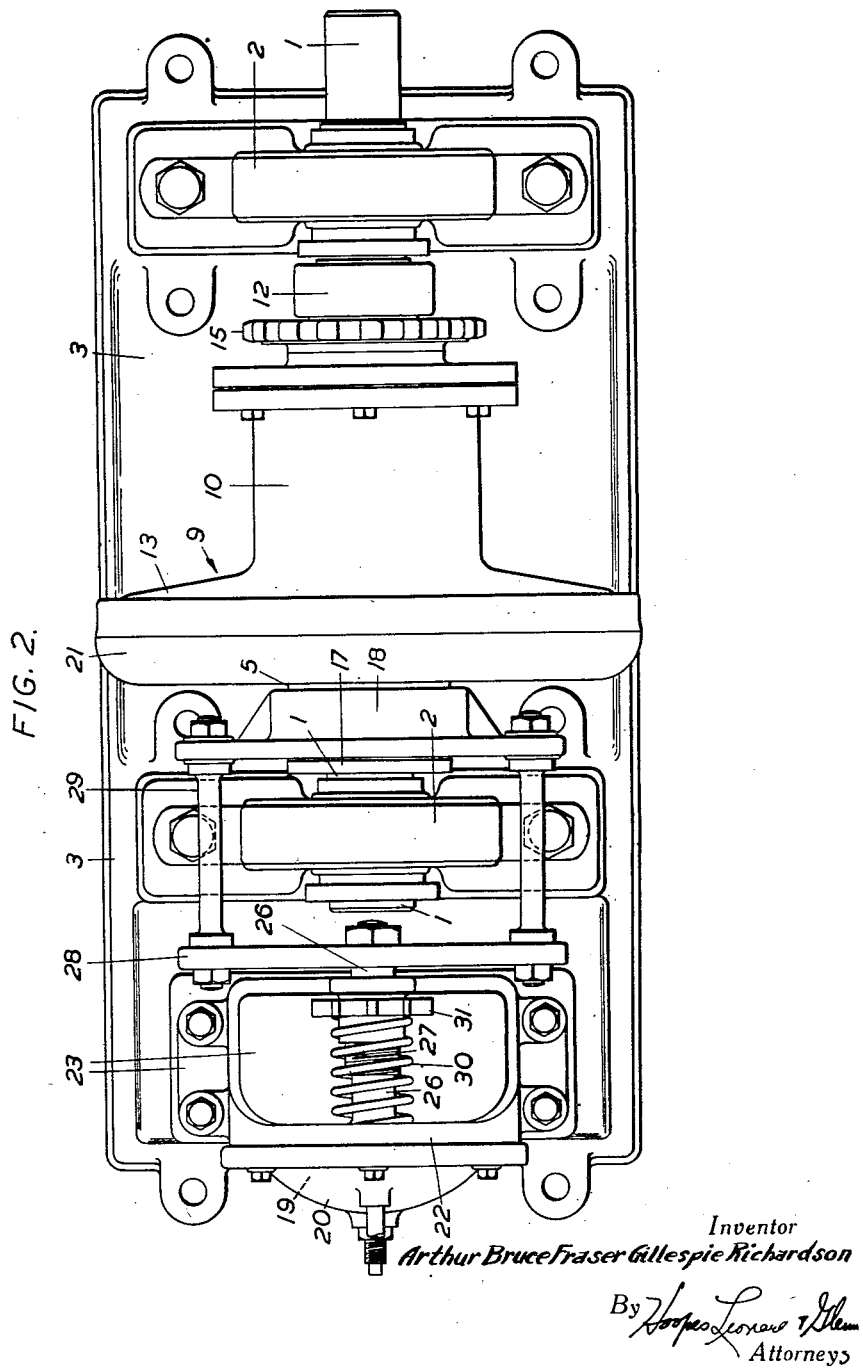

United States Patent Office 2,788,875
Patented Apr. 16, 1957

2,788,875
FRICTION CLUTCHES

Arthur Bruce Fraser Gillespie Richardson, Leigh, England, assignor to British Insulated Callender's Cables Limited, London, England, a British company Application March 26, 1952, Serial No. 278,636

Claims priority, application Great Britain April 9, 1951

3 Claims. (Cl. 192—85)

This invention relates to rotary friction clutches of the type operated by fluid pressure acting on a diaphragm directly or indirectly controlling the pressure between surfaces of the clutch members which are frictionally co-operable one with another to transmit torque from the driving to the driven member.

In take-up devices for electric cables, especially in such devices associated with the so-called continuous vulcanising machines, it is necessary to control the speed of rotation of the take-up reel very closely so that the linear speed of the take-up reel very closely corresponds with the linear speed of delivery of the cable being produced. This involves a wide variation in angular speed of the take-up reel due to the increase in effective diameter which takes place at the completion of each additional layer of cable on the reel. To this end the reel may be driven through a friction clutch and the slip at the clutch be controlled automatically in accordance with the tension in the cable being reeled, as by a fluid pressure control valve governed by movement of a jockey pulley engaged by the cable.

In known forms of fluid pressure operated friction clutches of the diaphragm type, the diaphragm is housed within either the driving or the driven member of the clutch and rotates with it and fluid for exerting pressure on the diaphragm is supplied to the rotating diaphragm chamber through a rotary seal. Seals of this nature are liable to become leaky, with the result that the clutch may not respond as accurately as required to movements of the fluid pressure control valve.

It is an object of this invention to provide an improved form of fluid pressure operated rotary friction clutch of the diaphragm controlled type that is free from the disadvantage referred to above and is suitable for use in take-up devices associated with continuous vulcanising machines and for other purposes where an accurate response of the clutch to its control means is especially desirable.

In accordance with the present invention the pressure between the frictionally co-operable surfaces of the two axially aligned clutch members of a rotary friction clutch is controlled by fluid pressure acting on a flexible diaphragm which forms part of a stationary diaphragm chamber located outside the clutch members and is mechanically coupled to one of the said clutch members which is axially movable. The statement that the diaphragm chamber is stationary implies that it does not rotate but does not necessarily mean that it has no movement in an axial direction. It may be fixed axially, in which case the central part of the diaphragm is coupled to the clutch member, or it may be permitted a limited degree of axial movement, as where the central part of the diaphragm is fixed and its outer part coupled to the clutch member. Preferably pressure is applied by the diaphragm to the rotating clutch member through an anti-friction thrust bearing.

The stationary diaphragm chamber may be of annular form and surround a clutch shaft but we prefer to locate it beyond one end of the clutch shaft and in axial alignment with it, as this permits of the use of a simple form of diaphragm.

The improved construction, by eliminating the need for a rotary seal between the source of supply of fluid under pressure and the diaphragm chamber, reduces the risk of leaks in the pressure system which lead to inaccuracies in the response of the clutch to movements of the valve governing the admission of fluid to the diaphragm chamber.

To enable the invention to be more fully understood and readily put into practice an example of a friction clutch controlled in accordance with the invention will now be described with reference to the accompanying drawings, wherein:

Figure 1 is a sectional view of the clutch with the frictionally co-operable surfaces of the clutch members in engagement, and Figure 2 is a plan of the clutch shown in section in Figure 1.

Referring now to the drawings, it will be seen that the clutch shown is of the single plate type and is supported on a shaft 1 rotatably supported at its ends in bearings 2 mounted on a bed-plate 3. The driving member 4 of the clutch comprises a hub portion 5 having at one end a flange 6 carrying an annular friction facing 7 on the face turned away from the hub 5. This member 4 is constrained by a feather key 8 or the like to rotate with the shaft 1 but is permitted a limited degree of axial movement relative to it. The other clutch member 9 comprises a hub 10 rotatably supported on the shaft 1 by bearings 11 and supported against the thrust exerted by the member 4 by a thrust washer 12. On the end of the hub 10 nearer the first member 4 is a flange 13 having an annular face 14 for frictional engagement with the friction facing 7 of the first member 4. To the other end of the hub 10 is secured a chain wheel 15 or other means by which a drive can be taken from it. On the hub 5 of the axially slidable clutch member 4 is positioned a ball thrust washer 16 and between this washer 16 and a nut or collar 17 removably secured on the outer end of the hub 5 is a thrust race 18.

Beyond the end of the clutch shaft 1 that is supported in the bearing adjacent the axially slidable clutch member 4 and in axial alignment with it, is a stationary diaphragm chamber 19. This chamber is formed by a dished plate 20 positioned with its concave side facing the clutch and by a diaphragm 21 whose circumferential edge is clamped between the circumferential edge of the plate 20 and a clamping ring 22 forming an apertured end wall of a box-like member 23 whose base is screwed to the bed-plate 3. The diaphragm 21, which is of rubber or the like, is centrally apertured and the part of the diaphragm bordering the aperture is clamped between a pair of clamping plates 24 and 25. On the outer plate 25 is a central stem 26 which projects through a support bearing 27 carried by the other end wall of the box-like member 23, towards the adjacent end of the clutch shaft 1. On the free end of the stem 26 is a thrust plate 28 which is mechanically coupled to the thrust race 18 on the hub 5 of the slidable clutch member 4 by a pair of stud bolts 29 which pass one on each side of the bearing 2 for that end of the shaft 1. Surrounding the stem 26 is a compression spring 30 located between the outer clamping plate 25 and an adjustable abutment provided by a hand nut 31 working on a screw threaded part of the circumferential surface of the stem support bearing 27. In the absence of fluid pressure on the diaphragm the spring holds back the slidable clutch member 4 from the other clutch member 9 to an extent limited by the adjustable stop 32. A guide pin 33 projecting from the neighbouring end wall of the box-like member 23 and entering a hole in the thrust plate 28 limits the torque that might otherwise be imparted to the diaphragm through the ball thrust washer 16 by the driving member 4 of the clutch.

Compressed air or other working fluid is admitted to the diaphragm chamber 19 through an opening 34 in the stationary dished wall 20 thereof, thus eliminating the need for a rotary seal such as is required with clutches as hitherto constructed in which the diaphragm chamber is incorporated in one of the rotatable clutch members. An opening 35 provided in the bottom of the chamber 19 for drainage purposes is normally closed by a drain cock 36. On the admission of compressed air or other working fluid to the chamber 19 the diaphragm is deflected to the right (when viewed as in Figure 1) against the counter thrust exerted by the spring 30 and moves the thrust plate 28 correspondingly. The movement of the thrust plate is transmitted through the stud bolts 29 to the race 18 which transfers its movement through thrust bearings 16 to the clutch member 4 to press it into engagement with the clutch member 9 and cause the clutch member 4 to drive the clutch member 9 at a speed controlled by the pressure of fluid in the chamber 19.

It will be appreciated from the foregoing description of a plate clutch operating in accordance with the invention that the invention is also applicable to cone clutches and to clutches of the multiple plate type.

What I claim as my invention is:

1. In combination a rotary friction clutch comprising a clutch shaft, driving and driven clutch members mounted on said shaft between bearings supporting said shaft, said clutch members having annular frictionally engageable surfaces co-operable with one another to transmit torque from the driving to the driven clutch member and one of said clutch members being axially slidable on said shaft and having a hub having a radial shoulder and an axially spaced thrust washer between which is a thrust race, spaced arms extending radially outwardly from said thrust washer beyond the shaft support bearing an axially fixed stationary diaphragm chamber in alignment with said clutch shaft, a flexible diaphragm forming an end wall of said chamber, means for admitting fluid under pressure to said chamber, a stem slidably mounted in a bearing co-axial with said clutch shaft, means coupling one end of said stem to the central part of said diaphragm, a thrust plate on the other end of said stem and space connecting rods, passing outside the neighbouring clutch shaft bearing, mechanically coupling the spaced arms on the thrust plate to the thrust washer, whereby pressure exerted by said fluid on said diaphragm can be transferred to said axially slidable clutch member to control the pressure between said frictionally engageable surfaces.

2. In combination a rotary friction clutch comprising a clutch shaft, an axially slidable clutch member mounted on said shaft, a second clutch member axially aligned with the first said clutch member and having a surface frictionally co-operable with a surface of the first said clutch member to transmit torque from one clutch member to the other, spaced bearings supporting said shaft on opposite sides of the two clutch members, a hub on the axially slidable clutch member having a radial shoulder and a spaced washer between which is a thrust race, spaced arms extending radially outwardly from said thrust washer beyond the adjacent shaft support bearing a diaphragm chamber lying beyond but in alignment with said clutch shaft, said chamber being formed by a dished plate axially fixed with its concave side facing the adjacent end of said clutch shaft and by a flexible diaphragm having a circumferential edge clamped between the circumferential edge of said plate and a clamping ring, said diaphragm being centrally apertured, inner and outer clamping plates clamping between them the part of said diaphragm bordering said aperture, a central stem on said outer clamping plate, a bearing in which said central stem is slidably supported and from which its outer end projects towards said shaft, a thrust plate on the outer end of said stem, and spaced connecting rods mechanically coupling said thrust plate to the arms on the thrust washer carried by the axially movable clutch member, whereby the pressure between said co-operable surfaces can be controlled by the pressure of fluid within said chamber.

3. In combination a rotary friction clutch comprising a clutch shaft, an axially slidable clutch member mounted on said shaft, a second clutch member axially aligned with the first said clutch member and having a surface frictionally co-operable with a surface of the first said clutch member to transmit torque from one clutch member to the other, spaced bearings supporting said clutch shaft on opposite sides of the clutch members, a hub on the axially slidable clutch member having a radial shoulder and a spaced washer between which is a thrust race, spaced arms extending radially outwardly from said thrust washer beyond the adjacent shaft support bearing a diaphragm chamber lying beyond but in alignment with said clutch shaft, said chamber being formed by a dished plate axially fixed with its concave side facing the adjacent end of said clutch shaft and by a flexible diaphragm having a circumferential edge clamped between the circumferential edge of said plate and a clamping ring, said diaphragm being centrally apertured, inner and outer clamping plates clamping between them the part of said diaphragm bordering said aperture, a central stem on said outer clamping plate, a bearing in which said central stem is slidably supported and from which its outer end projects towards said shaft, a compression spring surrounding said stem and located between said outer clamping plate and an adjustable abutment on the circumferential surface of said stem bearing, a thrust plate on the outer end of said stem, and spaced connecting rods mechanically coupling said thrust plate to the arms on the thrust washer carried by the axially movable clutch member, whereby the pressure between said co-operable surfaces can be controlled by the pressure of fluid within said chamber.

References Cited in the file of this patent

UNITED STATES PATENTS

| | | |
|---|---|---|
| 679,365 | Darling | July 30, 1901 |
| 1,050,414 | Woolley | Jan. 14, 1913 |
| 2,039,128 | Tiedemann | Apr. 28, 1936 |
| 2,158,250 | Peters | May 16, 1939 |
| 2,175,152 | Hey | Oct. 3, 1939 |
| 2,205,989 | Meyers | June 25, 1940 |
| 2,341,587 | Andres et al. | Feb. 15, 1944 |
| 2,492,465 | Dahl | Dec. 27, 1949 |
| 2,548,268 | Metsger | Apr. 10, 1951 |
| 2,642,614 | Sivaceh | June 23, 1953 |
| 2,664,108 | Von Weise | Dec. 29, 1953 |

FOREIGN PATENTS

| | | |
|---|---|---|
| 454,149 | Great Britain | Sept. 21, 1936 |